United States Patent [19]
MacLiver

[11] Patent Number: 5,997,085
[45] Date of Patent: Dec. 7, 1999

[54] CHILDREN'S SAFETY SEAT

[76] Inventor: Kevin Scott MacLiver, Elm House, Belle Walk, Moseley, Birmingham, B13 9DF, United Kingdom

[21] Appl. No.: 09/029,766

[22] PCT Filed: Sep. 6, 1996

[86] PCT No.: PCT/GB96/02210

§ 371 Date: Mar. 6, 1998

§ 102(e) Date: Mar. 6, 1998

[87] PCT Pub. No.: WO97/09194

PCT Pub. Date: Mar. 13, 1997

[30] Foreign Application Priority Data

Sep. 7, 1995 [GB] United Kingdom .................... 9518647
Dec. 5, 1995 [GB] United Kingdom .................... 9524808

[51] Int. Cl.$^6$ ............................... A47C 1/08; A47C 15/00
[52] U.S. Cl. ................. 297/248; 297/250.1; 297/256.16
[58] Field of Search ................. 297/248, 250.1, 297/256.13, 216.11, 256.1, 256.16, 188.01, 188.21

[56] References Cited

U.S. PATENT DOCUMENTS

| | | | |
|---|---|---|---|
| 4,186,961 | 2/1980 | Farell, Jr. et al. | 297/256.16 |
| 4,743,064 | 5/1988 | Takizawa | 297/216.11 |
| 5,033,761 | 7/1991 | Kelly | 297/248 |
| 5,496,091 | 3/1996 | Karl et al. | 297/248 |
| 5,518,293 | 5/1996 | Cory et al. | 297/248 |

*Primary Examiner*—Anthony D. Barfield
*Attorney, Agent, or Firm*—Caesar, Rivise, Bernstein, Cohen & Pokotilow, Ltd.

[57] ABSTRACT

The invention relates to a children's safety seat, particularly for the carrying of more than one child. It includes a children's safety seat to be securely and releasably attached to anchorage points in a motor vehicle when positioned on an existing seat of the vehicle. The seat can be provided with a back portion and a base portion which are sub-divided to provide a plurality of individual seats. The seat has integral members to enable it to be anchored in position.

9 Claims, 4 Drawing Sheets

CHILDREN'S SAFETY SEAT

This invention relates to a children's safety seat and is particularly concerned to provide a seat that can conveniently be fitted into and removed from a motor vehicle as required to enable more than one child to be safely accommodated.

Childs' safety seats are well known and usually comprise an individual child's seat which can be removably connected into a suitably anchored restraining harness on the back seat, or, in some instances, the front seat, of a motor car. Such seats are useful for children weighing up to about 30 kg and so are usually for children up to about 8 years of age.

Problems arise when it is necessary to cater for more than one child. Although it is quite possible to arrange for two separate safety seats to be releasably anchored on the rear seat of a car, it is difficult to cater for three children and virtually impossible for four. Moreover, the fitting of anchorages for a multiplicity of safety seats is time-consuming and expensive and the purchase and physical handling of a number of seats expensive and inconvenient.

It is an object of the invention to provide a safety seat that is suitable for more than one child and that is more convenient than current arrangements to deal with more than one child.

Accordingly in one aspect the invention provides a children's safety seat to be securely and releasably attached to anchorage points in a motor vehicle when positioned on an existing seat of the vehicle, the safety seat having a back portion and a base portion, those portions being sub-divided to provide a plurality of individual seats and the seat having integral means to enable it to be anchored in position.

In a particularly preferred embodiment, the seat is designed to extend for substantially the full width of the vehicle seat on which it is to be positioned. Thus, it may be of a length to completely fill the width of the rear seat of a motor car. It may be specifically designed to fit the full width of a particular make and model of car.

Such a full width children's seat may conveniently be sub-divided to provide four individual child's seats in the one integral seat. Alternately, it may be sub-divided to form three slightly larger seats for children or two or three children's seats and one adult seat.

Preferably the seat is integrally-moulded of plastics material to form a sufficiently strong and rigid integral back and base portion with integrally-formed sub-divisions in the form of protrusions on the back and/or base portions to define the individual seats.

The anchorage means may be suitably positioned holes or slots moulded into the seat to receive anchorage straps for attachment to secure anchorages on the vehicle in a conventional manner.

Alternatively the seat may be a welded metal frame having the back and base portions and welded subdividers. Suitable anchorage holes and slots may then be drilled in the desired locations.

The seat may carry suitable padding and decorative covering material together with individual harnesses for each child's seat portion, as is conventional.

The seat may be provided with front supporting legs, e.g. two legs, one at each front corner. These legs are preferably adjustable for width and height so as to be applicable to a variety of vehicles and they may bear down, for example, on the inner sills of the vehicle to provide additional rigidity and support.

It is not necessary that the seat be designed to fit onto the back seat of a car. It may, if desired, be designed to fit onto the front passenger seat, in which case it will normally be of a length to provide seats for two children, i.e. it will have one set of sub-dividers.

It is a requirement of law in certain countries that very young children must sit in a rearward facing seat. For example, in the United Kingdom, children up to 9 kg. in weight (approximately up to 10 months) must be seated in a rearward facing seat as their necks are insufficiently strong to support their heads in the event of a frontal collision of the vehicle in which they are travelling. In Sweden, children up to 4 years of age must be seated in rear-facing seats for similar reasons.

It is another object of this invention, therefore, to provide a child's safety seat for use in a rearward facing direction.

Accordingly, in a second aspect the present invention provides a small child's safety seat comprising a body shell in which the child can be seated, the shell having a first projection adjacent a first end thereof to clip into a corresponding recess in the backrest portion of a seat or frame in a motor vehicle and a stand portion attached to the underside of the shell, the stand portion having projections to clip into the substantially horizontal base portion of the seat or frame, whereby the shell can be locked to the seat or frame with the first end lower than its opposite end.

The safety seat of this second aspect may advantageously be used in conjunction with the children's safety seat of the first aspect of this invention.

The shell of the safety seat of the second aspect of the invention may be generally rectangular in plan so that the first projection can extend from a first of the two shorter edges and the stand may be positioned underneath the shell nearer to the opposite shorter edge than to the first edge.

By this means the safety seat can be positioned on a seat in a vehicle to face backwards with the head of the child comfortably above its feet in a semi-reclining position.

The shell may be an integral moulding of suitable plastics material and the stand and projections may be part of the integral moulding.

Alternatively, as indicated above the shell may be of welded metal construction.

Clearly the shell may be upholstered and carry safety harness in a conventional manner.

As indicated above, the safety seat of the second aspect of the invention is particularly intended for use with the children's safety seat of the first aspect. The first safety seat can have anchorage means in the form of holes or slots, formed, e.g. moulded, in it. It can, therefore, conveniently be formed with slots to receive the projections from the shell of the second seat and thereby lock the shell to it, which latter is firmly secured to the vehicle in which it is used. Thus the safety seat of the second aspect may be locked into one of the sub-divided individual child's seats in the safety seat of the first aspect. Where that latter seat is upholstered, it may be necessary to remove the upholstery from the sub-divided seat to receive the other seat but the upholstery can conveniently be arranged to be removable, e.g. by press-stud type fittings.

Embodiments of the invention will now be described by way of example only with reference to the accompanying drawings in which.

Figure 1:
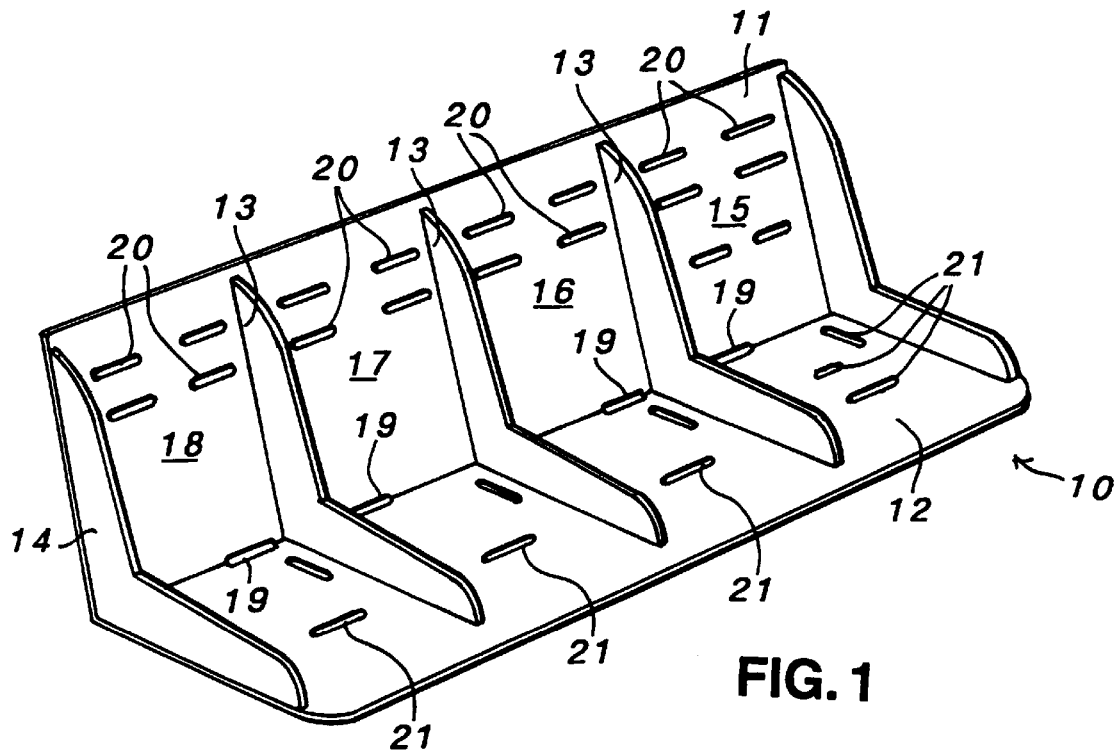
FIG. 1 is a perspective view of one form of chassis for a children's seat.

In FIG. 1, a children's seat chassis 10 has an integral back portion 11 and base portion 12. The seat has three sets of dividers 13 and end fittings 14 at each end to define four separate child's seats 15,16,17 and 18.

Slots 19 along the dividing line between back 11 and base 12 and slots 20 in the back 11 and 21 in the base 12 provide means to receive anchorage straps and child's harness straps while providing means for adjustment as required.

Figure 2:
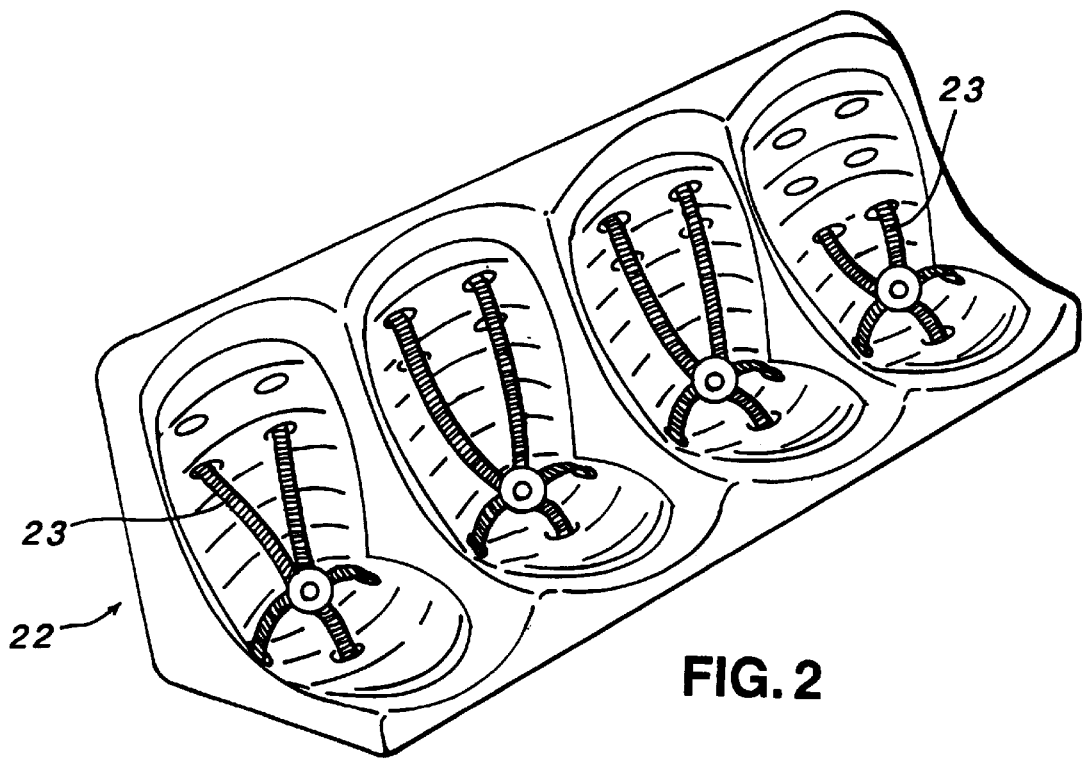
FIG. 2 shows the chassis of FIG. 1 upholstered and fitted with safety harness.

As indicated above and as shown in FIG. 2, the seat 22 will normally be upholstered to provide comfort and a pleasing appearance and will be fitted with releasable safety straps 23 to hold each child in position.

Figure 3:
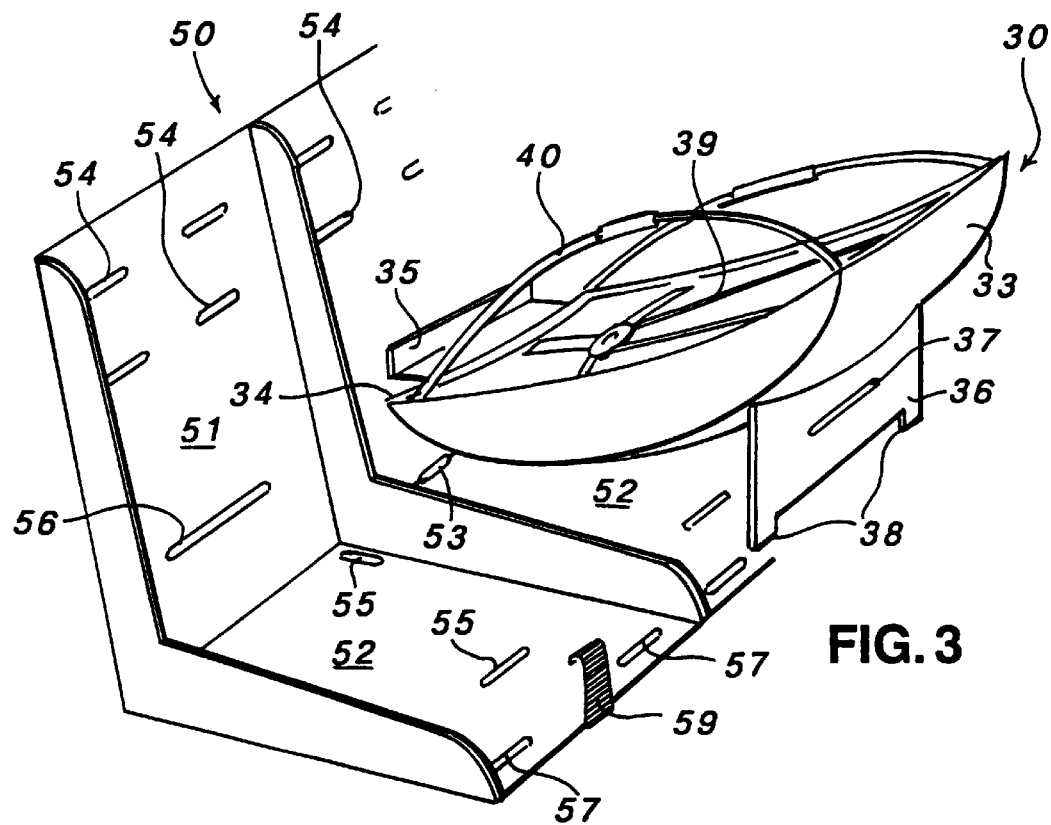
FIG. 3 is a perspective view of a seat of the second aspect of the invention being presented to a seat similar to that of FIG. 1.

In FIG. 3 is shown a baby's safety seat 30 of the second aspect of the invention and a portion of children's safety seat 50 similar to that shown in FIG. 1.

Safety seat 30 has a body shell 33 of generally rectangular plan form. At one shorter edge 34 it has a projecting locating tongue 35. Underneath it has a stand 36 containing a slot 37 and two projecting feet 38. It is upholstered internally by conventional means and has a safety harness 39 and straps 40 by which it can be carried when not in use in a vehicle.

Figure 4:
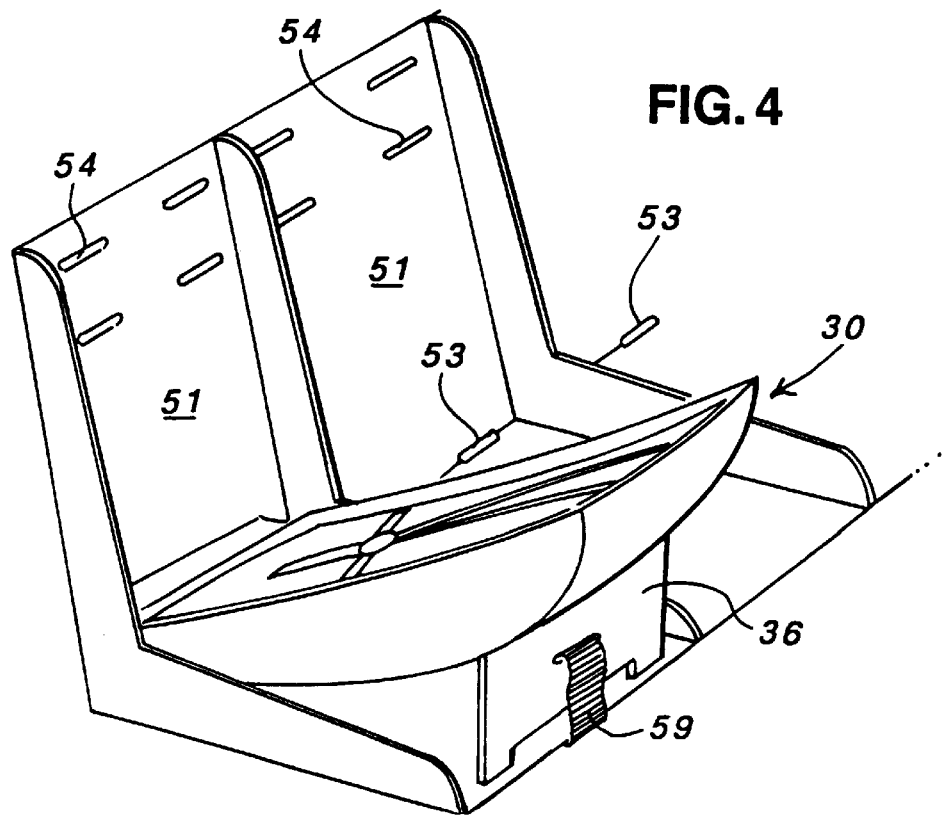
FIG. 4 is a similar view to FIG. 3 of the two seats locked together.

Seat 50 has a back portion 51 and a number of seat portions 52. The back and seat portions contain slots 53,54, 55 by which the seat may be anchored to a vehicle seat, and child harness straps may be secured to the safety seat 50. Additionally, back portion 51 contains a slot 56 to receive locating tongue 35 of seat 30 and seat portion 52 contains slots 57 to receive feet 38 of stand 36 of seat 30. Seat 30 may thereby be located on and locked to seat 50—see FIG. 4. As an additional locking means, seat portion 52 of seat 50 is provided with a clip 59 to locate in slot 37 of stand 36.

A baby can therefore be securely carried in seat 30 while facing rearwardly of the vehicle in which the seat is used.

Seat 50 has been shown unupholstered for convenience but it will be appreciated that all the seat portions on all but the one to receive seat 30 may be upholstered.

Figure 5:
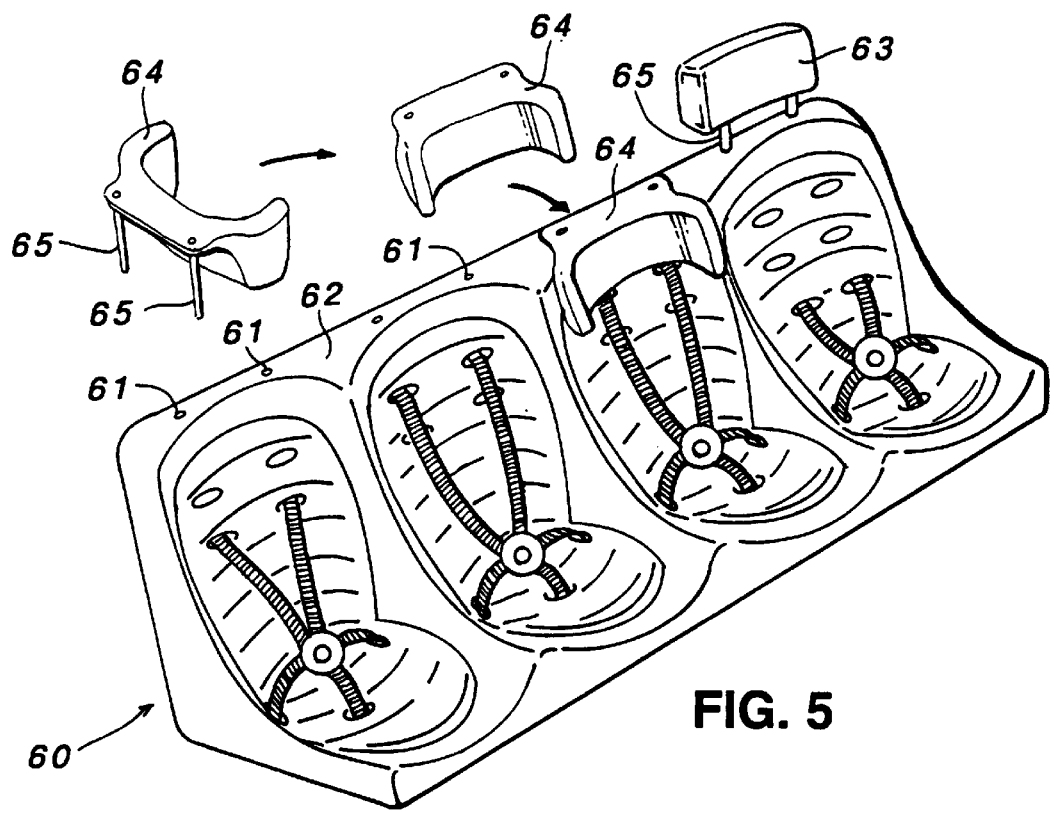
FIGS. 5 and 6 are perspective views of modifications that may be applied to the seat of the invention.
Figure 6:
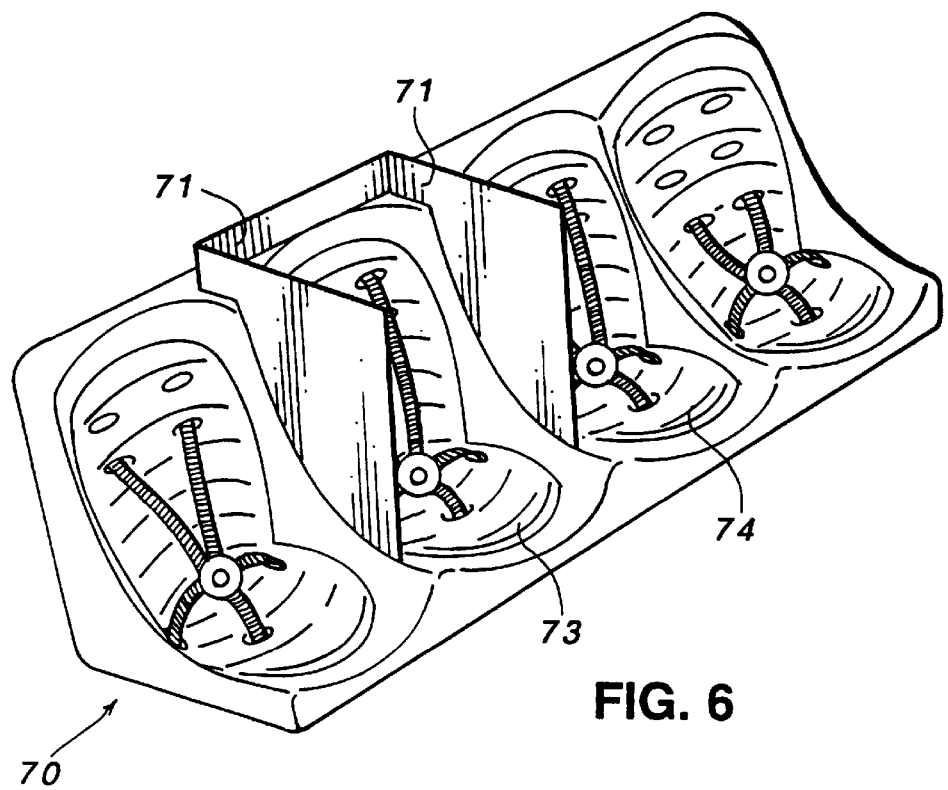

In FIGS. 5 and 6 are shown two modifications to a seat such as seat 22 in FIG. 2.

In FIG. 5, seat 60 may have a series of slots 61 in its upper edge 62 to receive head restraints 63 or 64 which have legs 65 to fit into slots 61.

In FIG. 6 seat 70 is provided with a divider screen 71 which fits into suitable slots between individual seat divisions 73,74. The screen may be useful in "curtaining off" one seat from another, which may be beneficial when carrying two or more small children.

Figure 7:
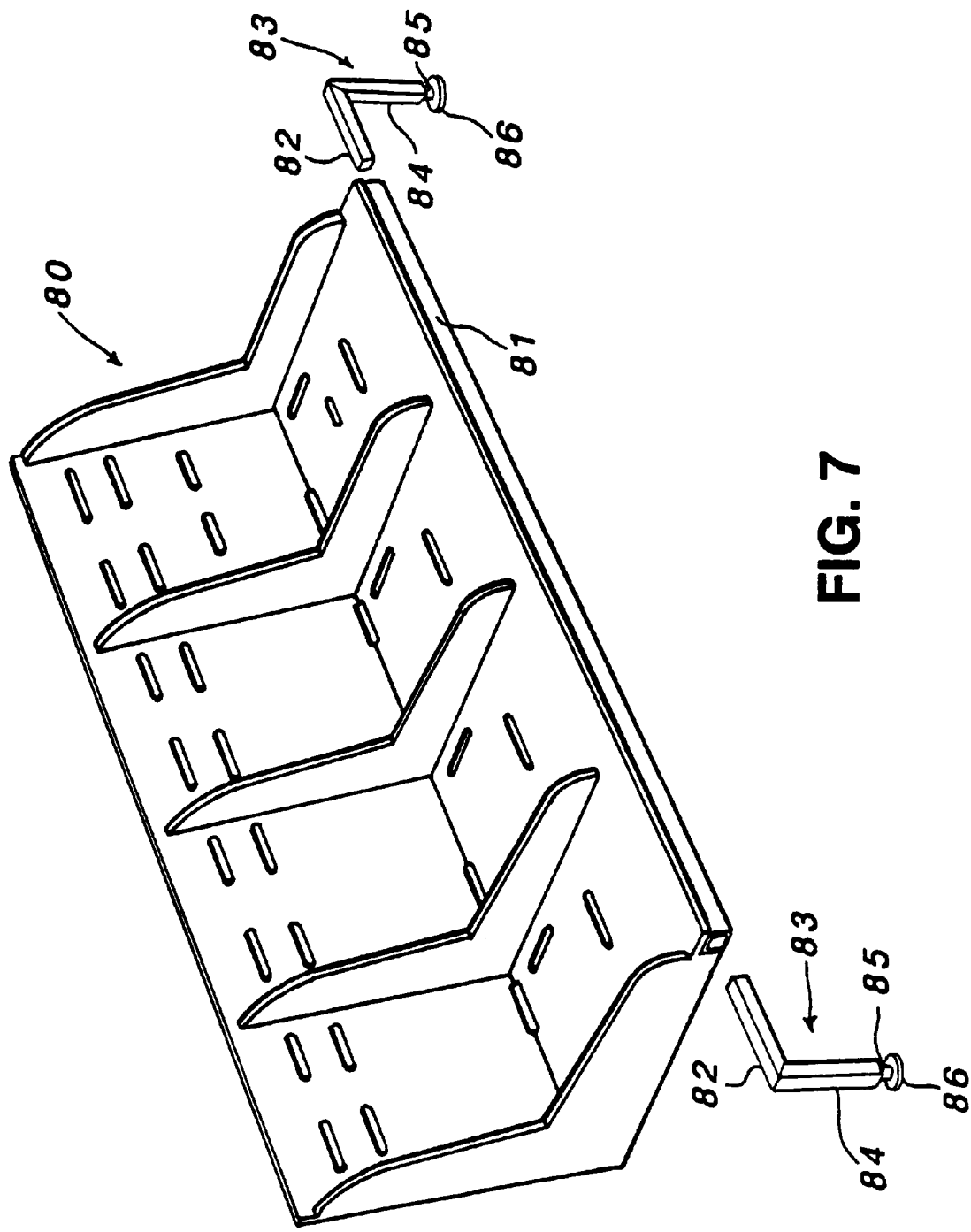
FIG. 7 is a view of a seat similar to that of FIG. 1 but having adjustable legs.

In FIG. 7 a seat 80 of the invention has a hollow passage 81 along its front edge. The passage is open at each end to receive a side extension 82 of a leg 83. The lower end of the vertical portion of each leg 83 has a screw-in rod 85 with a foot 86. Thus the legs can be adjusted horizontally by virtue of the degree of penetration of extension 82 into hollow passage 81, thereby adjusting the width between the pair of legs, and vertically by virtue of the amount rod 85 is screwed into leg portion 84.

Because the length of a seat of the invention can be tailored to the full width of the rear seat of the car to which it is to be fitted, it can be anchored very securely in position, even if wheel arches protrude into the car seat edges, so that there is little or no tendency for the safety seat to slide about.

I claim:

1. A children's safety seat comprising:
   a seat body including a base portion for being positioned on an existing seat of a vehicle and a back portion extending up from said base portion;
   divider means connected to said seat body for sub-dividing the seat body to provide a plurality of individual seats for accommodating respective children side-by-side;
   releasable anchoring means for connecting the seat body to anchorage points in said vehicle for securing the seat body therein; and
   adjustable support legs for engaging a body of the vehicle below said base portion and for supporting and providing additional rigidity to the seat body, said support legs being coupled to the base portion for vertical and horizontal movement with respect to the base portion.

2. The children's safety seat according to claim 1, wherein the divider means is operable for sub-dividing the seat body to provide four individual seats.

3. The children's safety seat according to claim 2, wherein the seat body comprises an integral molding of plastics material and said divider means comprise integrally-formed protrusions on at least one of said back and base portions to define the individual seats.

4. The children's safety seat according to claim 1, wherein the seat body comprises an integral molding of plastics material and said divider means comprise integrally-formed protrusions on at least one of said back and base portions to define the individual seats.

5. The children's safety seat according to claim 1, comprising head restraints having legs to be received in slots in an upper edge of the seat back portion.

6. The children's safety seat according to claim 1, wherein slots are provided in the seat body between adjacent individual seats and the seat includes further divider means having portions which fit into said slots.

7. The children's safety seat according to claim 1, incorporating a rearwardly facing seat which comprises a body shell which is generally rectangular in plan and in which a child can be seated, the shell having a first projection adjacent a first end thereof to clip into a corresponding recess in the back portion of said seat body and a stand portion attached to an underside of the shell, the stand portion having projections to clip into the base portion of the seat body whereby the shell can be locked to the seat body with the first end of the shell lower than its opposite end.

8. A children's safety seat comprising:
   a seat body including a base portion for resting on a seat cushion of a vehicle seat and a back portion extending up from the base portion and adapted to be adjacent a backrest of said vehicle seat;
   upholstery means and divider means connected to said seat body for subdividing the seat body to provide a plurality of individual front-facing seats for accommodating respective children side-by-side;
   releasable anchoring means for connecting the seat body to anchorage points in the vehicle for securing the seat body therein;
   adjustable support members connected to the seat body for adjustment movement with respect to the seat body and engageable with a body structure of the vehicle for providing additional support to the seat body; and
   a removable rear-facing seat for an infant or small child, the rear facing seat comprising a body shell which is generally rectangular in plan view and in which said infant or small child can be seated, first engagement means adjacent one end of the body shell and operable for connecting said one end of the body shell to the back portion of said seat body, a stand portion attached to an underside of the body shell and second engagement means connected to the said stand portion and operable for connecting the stand portion to the base portion of said seat body, said stand portion being operable for maintaining the said other end of the shell of the rear facing seat raised above the said one end.

9. The children's safety seat according to claim 8, wherein the first engagement means comprises a projecting tongue at said one end of the body shell for being inserted in a matching slot in said back portion of said seat body and said second engagement means comprises a projecting portion of the stand for being engaged with a matching slot in said base portion of said seat body.

* * * * *

UNITED STATES PATENT AND TRADEMARK OFFICE
CERTIFICATE OF CORRECTION

PATENT NO. : 5,997,085
DATED : December 7, 1999
INVENTOR(S) : Kevin Scott Macliver It is certified that error appears in the above-identified patent and that said Letters Patent is hereby corrected as shown below:

On title page, item 19 Title
 replace "MacLiver"
 with --Macliver--.

On title page, item 76 Inventor
 replace "MacLiver"
 with --Macliver--.

Signed and Sealed this

Twenty-sixth Day of December, 2000

*Attest:*

Q. TODD DICKINSON

*Attesting Officer*     *Director of Patents and Trademarks*